A. M. HEATH.
NUT LOCK.
APPLICATION FILED APR. 22, 1911.
1,016,147.
Patented Jan. 30, 1912.
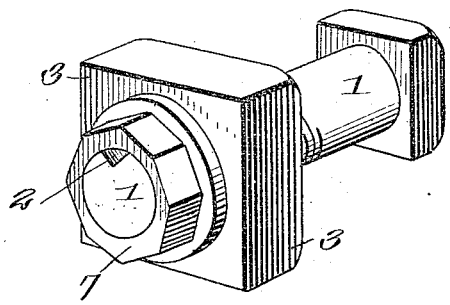
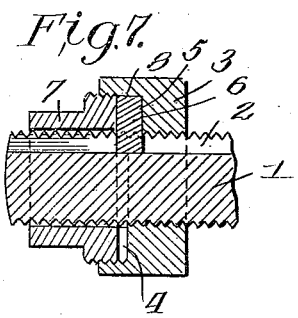
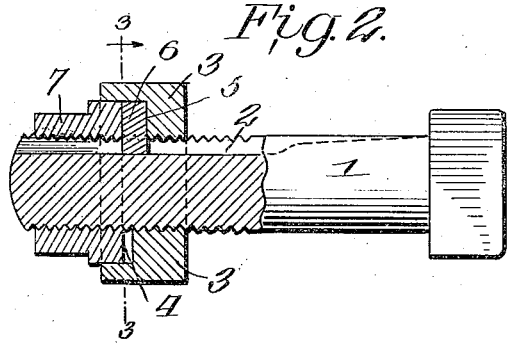
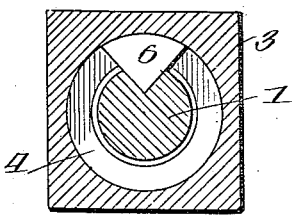
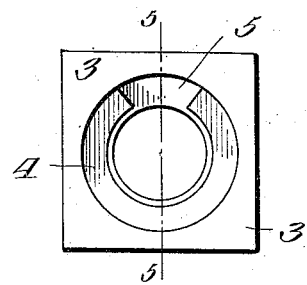
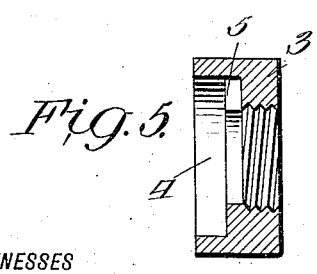
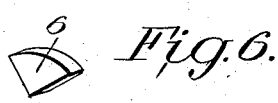
WITNESSES
Samuel E. Wade.
Andw W Hart
INVENTOR
ARTHUR M. HEATH
BY Munn&Co.
ATTORNEYS

UNITED STATES PATENT OFFICE.

ARTHUR M. HEATH, OF ARTESIA, NEW MEXICO.

NUT-LOCK.

1,016,147. Specification of Letters Patent. Patented Jan. 30, 1912.

Application filed April 22, 1911. Serial No. 622,647.

*To all whom it may concern:*

Be it known that I, ARTHUR M. HEATH, a citizen of the United States, and a resident of Artesia, in the county of Eddy and State of New Mexico, have invented an Improvement in Nut-Locks, of which the following is a specification.

My invention is an improvement in that class of nut-locks in which the nut is locked on the bolt by means of some detachable device that is adapted to enter registering grooves or recesses in both bolt and nut.

In my invention, the locking device which is held and concealed in a cavity in the face of the nut, and a smaller nut is screwed into such recess and thus holds the locking device securely in place and also prevents it from accidental contact with exterior objects, while permitting its easy removal when it is desired to detach the main nut from the bolt.

In the accompanying drawing Figure 1 is a perspective view of a bolt, nut, and locking means applied thereto. Fig. 2 is a longitudinal section of the same. Fig. 3 is a cross section on the line 3—3 of Fig. 2. Fig. 4 is a face view of the main nut. Fig. 5 is a central section of the nut taken on the line 5—5 of Fig. 4. Fig. 6 is a perspective view of the locking device. Fig. 7 is a sectional view showing a modification.

The threaded portion of the bolt 1 has a longitudinal V-shaped groove 2. The main nut 3 is provided with a circular face recess 4, and at one point in its circumferential portion such recess is provided with a segmental recess 5 for the reception of the peripheral portion of the sector-shaped locking device, the inner end or angular point of said device being received by the V groove in the bolt.

When the nut 3 is adjusted on the bolt 1 so that the segmental recess 5 registers with the groove 2 of the bolt, as shown in Figs. 2 and 3, it will be seen that the groove corresponds with or forms a continuation of the segmental recess, the two thus constituting a sector-shaped recess in which the locking device 6 is adapted to fit, as shown. It is obvious that said device thus prevents rotation of the nut 3 in either direction.

In order to hold the locking device 6 in place and to prevent contact of the same with exterior objects, a smaller nut 7 is screwed on the bolt and its inner end is made of such dimensions that it will enter the recess 4 of the main nut. The parts are shown adjusted in working position in Figs. 1 and 2, and in the latter the jam or securing nut 7 is screwed up against the locking device 6.

In order to unlock the main nut and remove it from the bolt, the smaller nut 7 must be unscrewed, and then the locking device 6, which fits loosely in place, may be readily drawn out of the recess 4 of the main nut.

In place of the securing nut 7 being screwed on the bolt, it may obviously be screwed into the main nut 3, and for that purpose a thread is formed on the periphery of the recess 4 of the main nut and also on the periphery of the nut 7, as indicated at 8 in Fig. 7.

What I claim is:—

The improved nut-lock formed by the combination with the threaded bolt having a lengthwise V-shaped groove, of a main nut having a circular face recess and also a small interior recess which is segmental in form, a sector-shaped locking device adapted to fit loosely in the corresponding cavity formed when the nut is adjusted with its aforesaid interior recess in registration with the groove of the bolt, and a securing nut also screwed on the bolt and having a circular periphery and adapted to fit loosely in the circular recess of the main nut, whereby the locking device is held in place and entirely concealed and protected, as described.

ARTHUR M. HEATH.

Witnesses:
MARGARET B. WRIGHT,
JESSE T. COLLINS.

---

Copies of this patent may be obtained for five cents each, by addressing the "Commissioner of Patents, Washington, D. C."